United States Patent
Bogner

(10) Patent No.: US 10,086,697 B2
(45) Date of Patent: Oct. 2, 2018

(54) METHOD AND DEVICE FOR FATIGUE DETECTION

(75) Inventor: Nico Bogner, Hankensbuettel (DE)

(73) Assignee: VOLKSWAGEN AG, Wolfsburg (DE)

(*) Notice: Subject to any disclaimer, the term of this patent is extended or adjusted under 35 U.S.C. 154(b) by 387 days.

(21) Appl. No.: 13/483,278

(22) Filed: May 30, 2012

(65) Prior Publication Data

US 2013/0166217 A1 Jun. 27, 2013

Related U.S. Application Data

(60) Provisional application No. 61/579,209, filed on Dec. 22, 2011.

(51) Int. Cl.
*B60K 28/06* (2006.01)

(52) U.S. Cl.
CPC ......... *B60K 28/06* (2013.01); *B60W 2540/22* (2013.01)

(58) Field of Classification Search
CPC ............................ B60K 28/06; B60W 2540/22
See application file for complete search history.

(56) References Cited

U.S. PATENT DOCUMENTS

| | | | |
|---|---|---|---|
| 3,879,617 A | 4/1975 | Faller | |
| 5,801,763 A | 9/1998 | Suzuki | |
| 6,313,749 B1 * | 11/2001 | Horne | G08B 21/06 340/575 |
| 6,825,469 B2 | 11/2004 | Yamaguchi et al. | |
| 7,043,056 B2 * | 5/2006 | Edwards et al. | 382/103 |
| 7,363,135 B2 | 4/2008 | Lin et al. | |
| 7,722,236 B2 | 5/2010 | Naganawa et al. | |
| 2008/0291032 A1 * | 11/2008 | Prokhorov | B60K 28/066 340/576 |
| 2009/0287368 A1 | 11/2009 | Bonne | |
| 2009/0322506 A1 | 12/2009 | Schmitz | |
| 2010/0007961 A1 * | 1/2010 | Kukita | B60R 1/007 359/605 |
| 2010/0039249 A1 | 2/2010 | Schmitz et al. | |
| 2013/0304326 A1 * | 11/2013 | Van Dongen | B60W 30/12 701/42 |

FOREIGN PATENT DOCUMENTS

| | | |
|---|---|---|
| DE | 102 18 676 A1 | 11/2003 |
| DE | 10347977 A1 | 5/2005 |
| DE | 10359125 * | 7/2005 |
| DE | 10359125 A1 * | 7/2005 |

(Continued)

OTHER PUBLICATIONS

Rogado, et. al. "Driver Fatigue Detection System," Proceedings of the 2008 IEEE International Conference on Robatics and Biomimetics, Bangkok, Thailand, Feb. 21-26, 2009, pp. 1105-1110.*

(Continued)

*Primary Examiner* — Thai Tran
*Assistant Examiner* — Christopher T Braniff
(74) *Attorney, Agent, or Firm* — Hunton Andrews Kurth LLP

(57) ABSTRACT

In a method for detecting driver fatigue in a vehicle having a memory device in which a fatigue model is stored, a sensor which detects at least one activity of the driver, and a sensor which detects the ambient brightness, the activity information is analyzed in the fatigue model and the brightness information is used for weighting the model.

18 Claims, 1 Drawing Sheet

(56) References Cited

FOREIGN PATENT DOCUMENTS

| | | |
|---|---|---|
| DE | 102005031311 A1 | 1/2007 |
| DE | 102005057267 A1 | 6/2007 |
| DE | 10 2008 037 267 A1 | 2/2010 |
| DE | 102009004487 A1 | 7/2010 |
| DE | 10 2009 046 913 A1 | 5/2011 |
| EP | 0911231 A2 | 4/1999 |
| WO | 2008052827 A1 | 5/2008 |

OTHER PUBLICATIONS

Rogado, "Driver Fatigue Detection System," Proceedings of the 2008 IEEE International Conference on Robotics and Biomimetics, Bangkok, Thailand, Feb. 21-26, 2009, pp. 1105-1110.*

Rogado, "Driver Fatigue Detection System," Proceedings of the 2008 IEEE International Conference on Robotics and Biometrics, Bangkok, Thailand, Feb. 21-26, 2009, pp. 1106-1110.*

* cited by examiner

METHOD AND DEVICE FOR FATIGUE DETECTION

CROSS-REFERENCE TO RELATED APPLICATIONS

The present application claims the benefit of U.S. Provisional Patent Application Ser. No. 61/579,209, filed on Dec. 22, 2011, which is expressly incorporated herein in its entirety by reference thereto.

FIELD OF THE INVENTION

The present invention relates to a method and a device for fatigue detection.

BACKGROUND INFORMATION

It is conventional to consider the biorhythm in a fatigue detection analysis. For example, a person is more rested in the morning than in the afternoon or evening. For this reason it is conventional to store a biorhythm in a memory of a vehicle and to take this biorhythm into account as well when analyzing the model for fatigue detection, which model may be an algorithm. The influence of the biorhythm as a function of the time of the day is likewise considered for the purpose of weighting the fatigue model.

However, it is also conventional that the biorhythm of one driver does not necessarily coincide with the biorhythm of another driver. The biorhythm of a person from southern Europe, for example, differs from that of a person from Central Europe.

For this reason it should not be attempted to use a psychological reference curve, a biorhythm or the like stored in a memory of the vehicle for fatigue detection and to take them into account when detecting fatigue or when determining the attentiveness of a driver of a vehicle.

SUMMARY

Example embodiments of the present invention provide a model for determining the attentiveness of a driver, to the effect that a biorhythm model for weighting the degree of attentiveness will no longer be required.

According to example embodiments of the present invention, a model for determining the fatigue or attentiveness, or the degree of attentiveness, which is stored in a memory of a computing device in a vehicle, is connected to a sensor for determining the brightness in the vehicle vicinity, so that this information, too, is utilized for weighting the model for fatigue determination. Furthermore, additional information that comes from the driver and is detected by a sensor is analyzed. This information may be the driver's operation of a control element of the vehicle, e.g., a steering wheel. As an alternative or in addition, a state of the driver is detected with the aid of a sensor, such as a camera, and additionally utilized for fatigue evaluation. This activity may be determined as a function of eyelid movements or the pupil size or the pulse rate, for example.

It may be provided to accommodate the sensor for the brightness determination in the interior of the vehicle. A particularly suitable location is the cluster instrument, e.g., the area between the tachometer and the rpm indicator.

Furthermore, the acceleration and/or speed of the vehicle may be taken into account when determining driver fatigue.

In addition, a sensor for measuring the temperature in the interior may be used and also considered in the analysis.

It may be provided to take the outside temperature into account in addition and to relate it to the inside temperature following a specific driving time. When it is cold in the winter and the internal temperature has been reached after a driving for 20 minutes, for example, it may be assumed that this temperature difference causes the driver to tire sooner.

The light sensor for determining the ambient brightness may be a function of the geographical location. That is to say, in a country such as Sweden, the brightness during the day is not as pronounced as in a country such as Spain. This influence is taken into account in that the information from a GPS or Galileo system is utilized and analyzed as well and therefore taken into account in weighting the fatigue.

As an alternative or in addition, the season may be estimated too, via the information of the outside temperature. The sun's position is dependent on the season and thereby is able to be considered as well.

According to example embodiments of the present invention, the model includes at least one vehicle-specific parameter, e.g., the width of the vehicle. Additional parameters include the length, the weight, etc.

If fatigue is detected, the driver is informed of this fact via a display device, for example, in the instrument cluster or the navigation display or a monitor. Furthermore, it is possible that a signal is heard, in addition or as an alternative, so as to warn the driver.

Further features and aspects of example embodiments of the present invention are described in more detail below with reference to the appended Figures.

DETAILED DESCRIPTION

Figure 1:
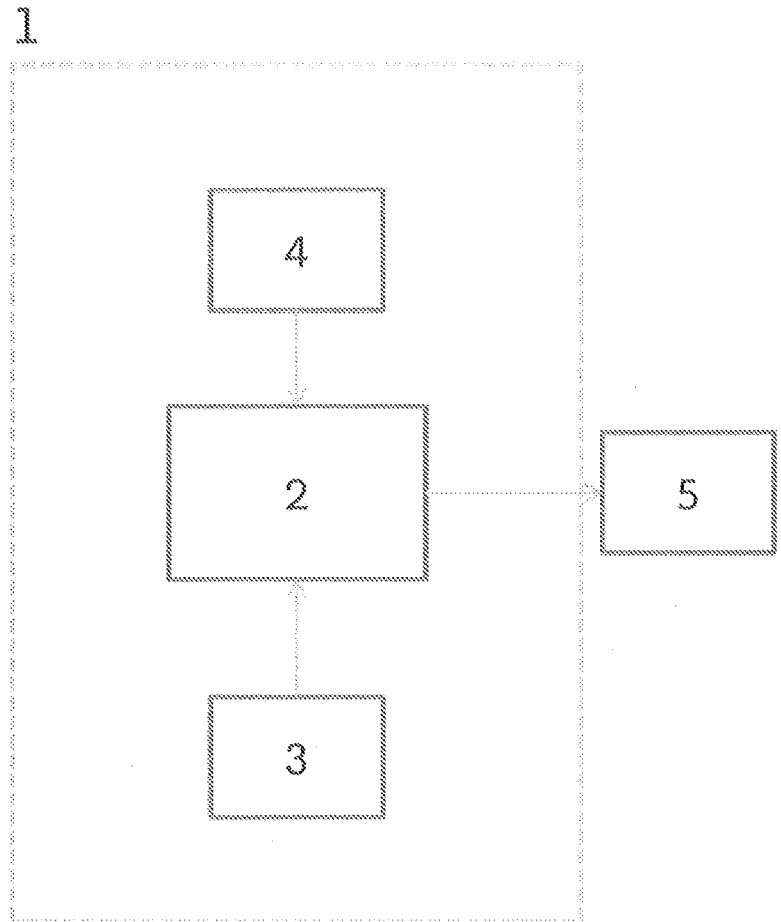
FIG. 1 is a schematic view of a device for implementing the method for fatigue detection.

FIG. 1 shows an exemplary embodiment of the present invention. A computing device 2 includes a model, such as an algorithm, with the aid of which fatigue is determined. A steering activity of the driver is ascertained by a first sensor 3, which is mounted on a steering column of a vehicle, for example. This steering activity may be a steering torque applied by the driver, or a steering speed. This information is utilized for analyzing the fatigue model. The influence of the brightness on the model may be achieved by a second sensor 4, which may be a brightness sensor. This information is utilized for weighting the fatigue model. A GPS receiver is able to determine the vehicle location in conjunction with a digital map. This information is also taken into account in the weighting because the brightness value is likewise a function of the sun's position, e.g., the geographical location. If the model determines fatigue of the driver, this will be indicated to the driver on a display 5.

Figure 2:
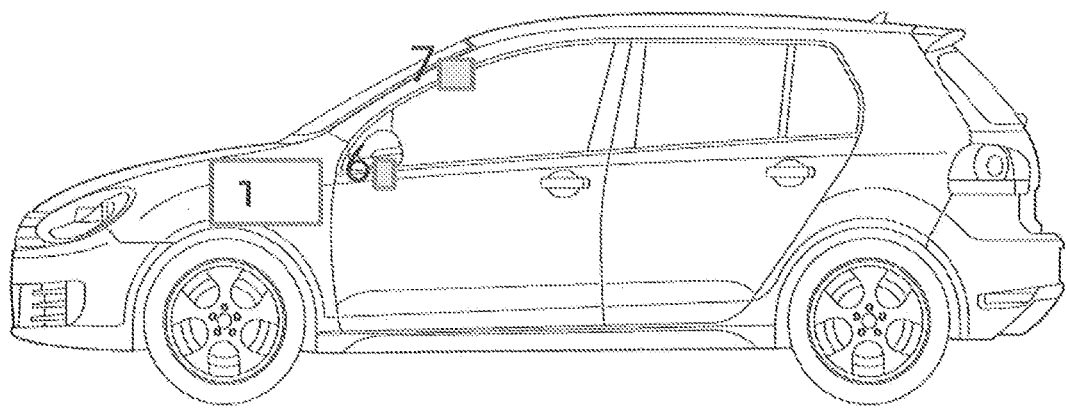
FIG. 2 illustrates a vehicle having a device for fatigue detection.

A device 1 according to an example embodiment of the present invention in a vehicle is shown in FIG. 2. A display device is included, e.g., either in the instrument cluster and/or in the center console.

LIST OF REFERENCE NUMERALS

1 Device for fatigue detection
2 Computing device
3 Sensor for detecting an action of the driver
4 Brightness sensor 5 Display device
6 Steering sensor
7 Camera

What is claimed is:

1. A method for detecting driver fatigue in a vehicle including a memory device in which a predetermined fatigue model is stored, a position detector configured to detect a geographical location of the vehicle on a map, a sensor configured to detect at least one activity of a driver, and a sensor located in a cluster instrument, configured to detect ambient brightness comprising:
analyzing activity information in the fatigue model, wherein the fatigue model is independent of a biorhythm model;
determining a relative position of the sun based on a latitudinal coordinate of the detected geographical location; and
weighting the predetermined model in accordance with the detected ambient brightness and in accordance with a known brightness based on the determined relative position of the sun.

2. The method according to claim 1, further comprising detecting the activity of the driver by a steering motion.

3. The method according to claim 1, further comprising detecting the activity of the driver by a camera.

4. The method according to claim 1, wherein the model for fatigue detection includes at least one vehicle-specific parameter.

5. The method according to claim 1, further comprising displaying information on a display if fatigue is detected.

6. The method according to claim 1, further comprising weighting the model in accordance with outside temperature.

7. The method according to claim 1, further comprising weighting the model in accordance with a difference between outside temperature and inside temperature.

8. The method according to claim 1, wherein the sensor configured to detect ambient brightness is arranged in a vehicle interior.

9. The method of claim 1, further comprising determining fatigue of the driver based in part on an acceleration of the vehicle.

10. The method of claim 1, further comprising determining fatigue of the driver based in part on a speed of the vehicle.

11. The method of claim 1, wherein the position detector is a GPS receiver.

12. A method for detecting driver fatigue in a vehicle including a memory device in which a predetermined fatigue model is stored, comprising:
detecting a geographical location of the vehicle on a map;
determining a relative position of the sun based on a latitudinal coordinate of the detected geographical location of the vehicle;
detecting activity information relating to at least one activity of a driver;
detecting ambient brightness with a sensor located in a cluster instrument;
analyzing activity information in the fatigue model, wherein the fatigue model is independent of a biorhythm model; and
weighting the predetermined model in accordance with the detected ambient brightness and in accordance with a known brightness based on the determined relative position of the sun.

13. A device for fatigue detection of a driver in a vehicle, comprising:
a sensor configured to determine an activity by the driver;
a position detector configured to detect a geographical location of the vehicle on a map;
a sensor, located in a cluster instrument, configured to determine a brightness in an environment of the vehicle; and
a computing device adapted to store a predetermined model, to determine a relative position of the sun based on a latitudinal coordinate of the detected geographical location of the vehicle, to determine fatigue in accordance with the model and in accordance with activity information, and to assign weights to the predetermined model in accordance with the determined brightness in an environment of the vehicle and in accordance with a known brightness based on the determined relative position of the sun, wherein the model is independent of a biorhythm model.

14. The device according to claim 13, further comprising a display configured to display fatigue information.

15. The device according to claim 13, wherein the sensor configured to determine activity of the driver includes a steering sensor.

16. The device according to claim 13, wherein the sensor configured to determine activity of the driver includes a camera inside the vehicle.

17. A method for fatigue detection in a vehicle, comprising:
weighting a predetermined algorithm for determining driver fatigue in accordance with information of a brightness sensor and in accordance with a known brightness based on a relative position of the sun, wherein the algorithm is independent of a biorhythm model, wherein the brightness sensor is configured to detect ambient brightness, wherein the geographical location of the vehicle is detected by a position detector; and wherein the relative position of the sun is ascertained based on a latitudinal coordinate of the detected geographical location of the vehicle.

18. The device of claim 13, wherein the position detector is a GPS receiver.

* * * * *